United States Patent [19]

Marino

[11] 4,107,664

[45] Aug. 15, 1978

[54] RASTER SCANNED DISPLAY SYSTEM

[75] Inventor: Francis C. Marino, Dix Hills, N.Y.

[73] Assignee: Burroughs Corporation, Detroit, Mich.

[21] Appl. No.: 702,538

[22] Filed: Jul. 6, 1976

[51] Int. Cl.[2] .............................................. G06K 15/20

[52] U.S. Cl. .............................. 340/324 AD; 315/364

[58] Field of Search .................. 340/324 AD; 178/30, 178/15; 354/6

[56] References Cited

U.S. PATENT DOCUMENTS

| | | | |
|---|---|---|---|
| 3,182,308 | 5/1965 | Dutton et al. | 340/324 AD |
| 3,553,676 | 1/1971 | Raciti | 354/6 X |
| 3,609,743 | 9/1971 | Lasoff et al. | 340/324 AD |
| 3,742,482 | 6/1973 | Albrecht et al. | 340/154 |
| 3,878,536 | 4/1975 | Gilliam | 340/324 AD |
| 3,987,431 | 10/1976 | Ljung | 340/324 AD |

*Primary Examiner*—David L. Trafton
*Attorney, Agent, or Firm*—Hane, Roberts, Spiecens & Cohen

[57] ABSTRACT

A cathode ray tube (CRT) display system utilizing a parallel line raster scan displays characters formed from matrices of dots written during the parallel line scans. When the parallel lines are vertically displaced horizontal lines, the height of the characters is changed by switching between a sequential scan line raster and an interlaced scan line raster, and the width of the characters is changed by controlling the number of times each of the dots is sequentially displayed in its associated scan line.

8 Claims, 17 Drawing Figures

RASTER SCANNED DISPLAY SYSTEM RDS

RASTER SCANNED DISPLAY SYSTEM RDS

VERTICAL MAGNIFICATION SELECTOR VMS

HORIZONTAL MAGNIFICATION SELECTOR HMS

TEXT LINE SELECTOR TLS

HORIZONTAL SIGNALS GENERATOR HG

VERTICAL SIGNALS GENERATOR VG

FONT MEMORY FM

DOT GENERATOR DG

RASTER SCANNED DISPLAY SYSTEM

BACKGROUND OF THE INVENTION

This invention pertains to display systems and more particularly to such display systems utilizing raster scans.

In the many areas there is a need for systems which display text. Of the many areas, computer terminals and word processors rely heavily on visual displays using cathode-ray tubes. In cathode ray tube (CRT) displays, the electron beam is moved to different points of the screen to paint the graphics of the text. There are three general techniques for generating the characters. In one technique, there is a stencil within the tube and the electron beam is first directed to the position in the stencil having the desired graphics and after the beam is shaped by the opening it is directed to the desired position on the screen. Such devices as represented by the Charactron have very expensive electron deflecting structures and have limited font capacity. The second technique utilized vector or segment generators and is exemplified by U.S. Pat. Nos. 3,579,023 and 3,335,416. Such generators require complicated electronics using stabilized analog operational amplifiers. The third technique is borrowed from conventional television receivers and is ideally suited for inexpensive mass produced displays.

The third technique relies on the generation of a scanning raster comprising a plurality of parallel sweeps of the beam across the screen. During the sweeps, the beam is intensity modulated to form the graphics. One variation as exemplified in U.S. Pat. No. 3,471,848 generates a raster of vertical lines and the graphic is "painted" by means of strokes. This variation is popular when high quality characters are desired. Another variation as exemplified in U.S. Pat. No. 3,803,583 which generates a raster of horizontal lines and the graphic is "painted" by dots. This second variation has been very popular for relatively low cost displays used in word processors and computer terminals having CRT monitors.

In CRT monitors utilizing dot matrices and raster scans, the line scanning can be performed using either sequential or interlaced techniques. For given horizontal and vertical sweep rates twice the total number of graphics can be displayed on the CRT screen using interlaced scanning rather than sequential scanning. With vertical sweep rates of 60 Hz or 50 Hz, flicker, or interline scintillation, is present with interlaced scanning whereas no flicker is noticeable with sequential scanning. For this reason sequential scanning is preferred except where the quantity of data to be displayed forces the designer to employ interlaced scanning.

In the field of CRT terminals the trend is toward displaying larger quantities of alphameric data. Consequently, the application of interlaced scanning and higher resolution CRT monitors are increasing together with the use of longer persistance CRT phosphors in order to display the increased quantity of data without the annoyance of flicker.

Previously, a 2,000 character display was considered large. Currently, 4,000 to 8,000 character displays are becoming common. In order to keep the size of the CRT terminal within acceptable limits for office environments, this increased volume of data is often displayed on relatively small CRT screen sizes. Typically, 15-inch diagonal screens are employed allowing usable display dimensions approximating an $8\frac{1}{2}$ inches $\times$ $11\frac{1}{2}$ inches sheet of paper. Displaying from 4 to 8 thousand characters within these dimensions results in relatively small characters. Despite the finer resolution and freedom from flicker provided by the better-engineered displays, experience with such displays are beginning to indicate that operators tire more readily due to prolonged viewing of the smaller characters.

SUMMARY OF THE INVENTION

It is therefore an object of the invention to provide a raster type display in which the characters being displayed can be selectively magnified.

It is another object of the invention to provide apparatus and methods for selectively changing the resolution of the raster scan.

BRIEF DESCRIPTION OF THE DRAWING

Other objects, the features and advantages of the invention will be apparent from the following detailed description when read with the accompanying drawing which shows by way of illustration and not limitation a display system utilizing the invention. In the drawing.

DESCRIPTION OF AN EMBODIMENT

Figure 1:
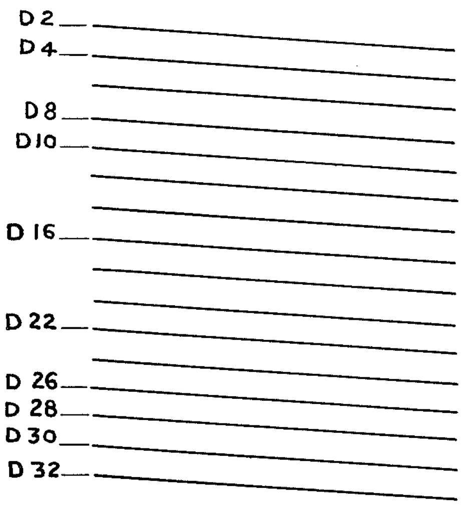
FIG. 1 is a diagram of one sequential raster scan.
Figure 2:
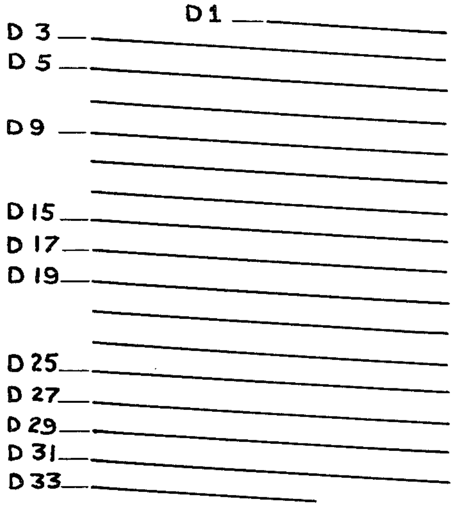
FIG. 2 is a diagram of another sequential raster scan.
Figure 3:
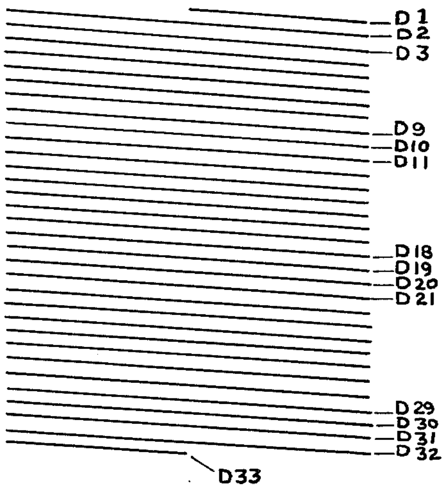
FIG. 3 is a diagram of a raster scan wherein the scans of FIGS. 1 and 2 are interlaced.

In a typical display device such as a CRT monitor the electron beam is controllably deflected in vertical and horizontal directions while being accelerated toward the screen. If the beam were continuously on during each horizontal scan line one would see the line pattern shown in FIG. 1 wherein each horizontal line is written from left to right while the lines progress from top to bottom. Because the beam is simultaneously deflected in the horizontal and vertical directions there is a slight tilt of all horizontal lines. In addition because of the finite time required for the beam to retrace from the right hand end of one scan line to the left hand end of the next scan line, adjacent lines are spaced from each other by a controllable amount. Note the beam is turned off (horizontal blanking) during each such retrace. When the bottom scan line is finished the beam is turned off (vertical blanking) and deflected to the upper left hand corner of the screen to begin the next raster at the left end of the top horizontal line. Thus FIG. 1 shows a sequential raster scan of even numbered scan lines. The significance of even numbered scan lines will become apparent hereinafter. If, however, the sequence of horizontal scan lines for the raster are started slightly after the end of the vertical retrace then scan lines will be displaced vertically downward by a slight amount. Such a scan is shown in FIG. 2 which shows a sequential raster scan of odd numbered scan lines. If now one generates for a first raster scan or field the raster scan of even scan lines and then for the next raster scan or field the raster scan of odd scan lines, there is generated an interlaced scan of lines having twice the density or resolution of either sequential scan. Such an interlaced scan raster is shown in FIG. 3 where the odd scan lines are interlaced with the even scan lines. It should be noted that by switching between interlaced and sequential raster scans the resolution of the scan is changed.

With either type of scanning the generation of the raster is controlled by a set of four signals: the vertical sync (VS) which controls the starting time of a field, i.e., the start of the top horizontal line; the horizontal sync (HS) which controls the starting time of each horizontal line; the vertical blanking (VB) which "turns off" the electronic beam during its deflection from the end of the bottom horizontal line to the start of the top horizontal line; and the horizontal blanking (HB) which "turns off" the electronic beam during its deflection from the end of any one horizontal line to the start of the next lower horizontal line. It should be noted that the rasters shown in FIGS. 1, 2 and 3 have substantially less than the normal number of lines and have been limited to this small number merely to illustrate the principle involved. In fact, the system to be described has over 400 lines.

Figure 4:
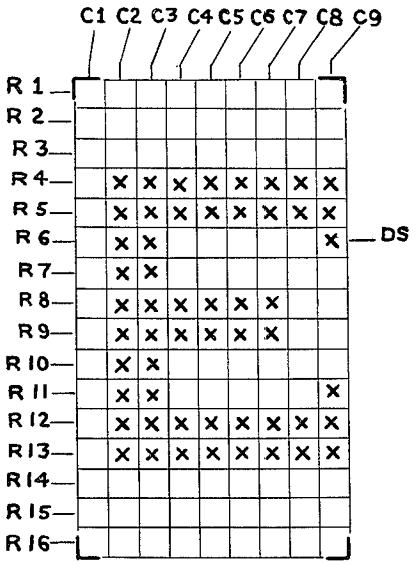
FIG. 4 is a diagram of a dot matrix for the character E.

In addition to these four control signals the monitor receives an information signal which is used to intensity modulate the electron beam during its deflection from left to right along each horizontal line. Since the system is to display graphics represented by dot matrices the information signal will be a binary pulse, no pulse sequence. A typical dot matrix for the character E is shown in FIG. 4. The matrix comprises sixteen rows R1 to R16 and nine columns C1 to C9, where each X represents a dot. It so happens that rows R1, R2, R3, R14, R15, and R16 contain no dots. However, for other characters having ascenders and/or descenders some or all of the rows can be used. In addition, these rows can be used for the space between displayed text lines. Furthermore, column C1 can be used for the space between displayed graphics. (While specific dot matrix dimensions of 9 by 16 have been shown other dimensions such as 5 by 7 and upward could be used.)

Figure 5:
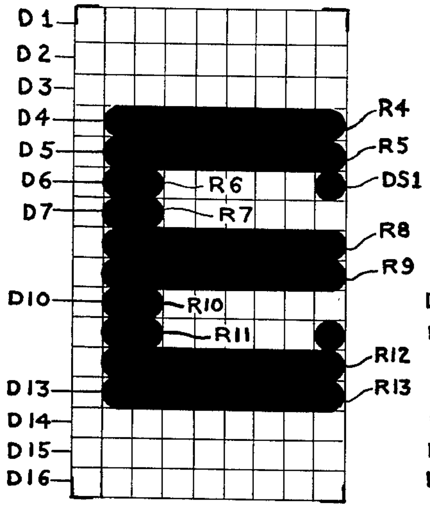
FIG. 5 is a representation of the display of the character E according to the matrix of FIG. 4.

When the dot matrix is displayed, each row of the dot matrix is recorded on a different line of the CRT display. When an interlaced scan is used the character E represented by the dot matrix of FIG. 4 will appear as shown in FIG. 5. If one assumes that the character is written in the first text line of the display i.e., the first 16 display lines D1 to D16, then it is seen that the character occupies all the display lines D1 to D16 with the body of the character occupying each and every display line D4 to D13.

Figure 6:
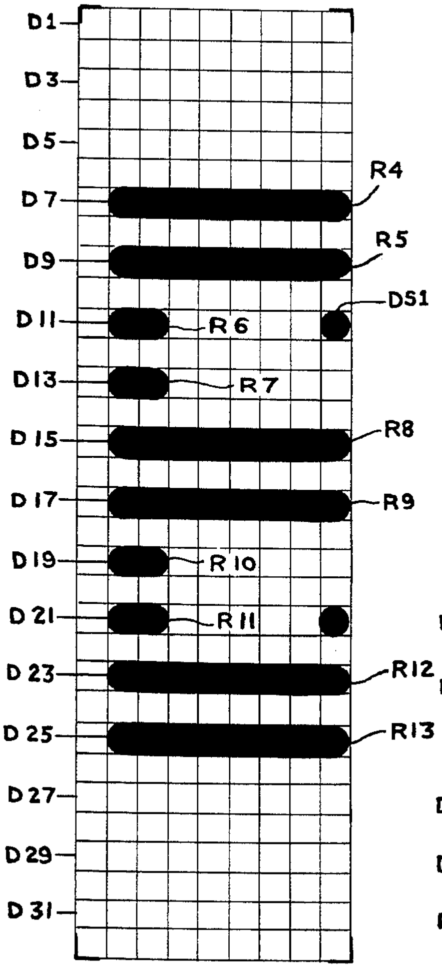
FIG. 6 is a representation of such character E with a two-to-one height magnification.

One can have a two-to-one magnification of the height of the character by recording the same dot matrix using a sequential scan. As shown in FIG. 6, there is one horizontal line gap between each pair of written horizontal lines. Where in FIG. 5 with an interlaced scan, a row $R_n$ of the matrix is written on a display line $D_{(n)}$, in FIG. 6 with a sequential scan, a row $R_n$ of the matrix is written on a display line $D_{(2n-1)}$.

Hence, by switching from an interlaced scan to a sequential scan the character is magnified vertically by a factor of two. In other words, the height of the character is changed by changing the spacing between actual adjacent scan lines.

Figure 7:
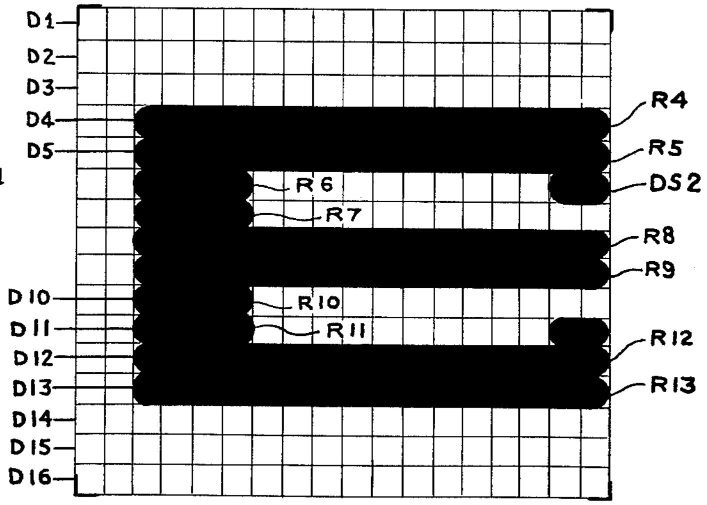
FIG. 7 is a representation of such character E with a two-to-one width magnification.

If one wishes to horizontally magnify the character it is only necessary to display each dot of the row twice instead of once. Thus, the single dot DS of FIG. 4 representing a serif is recorded as a single dot DS1 in FIGS. 5 and 6 but is recorded as two dots DS2 in FIG. 7.

Figure 8:
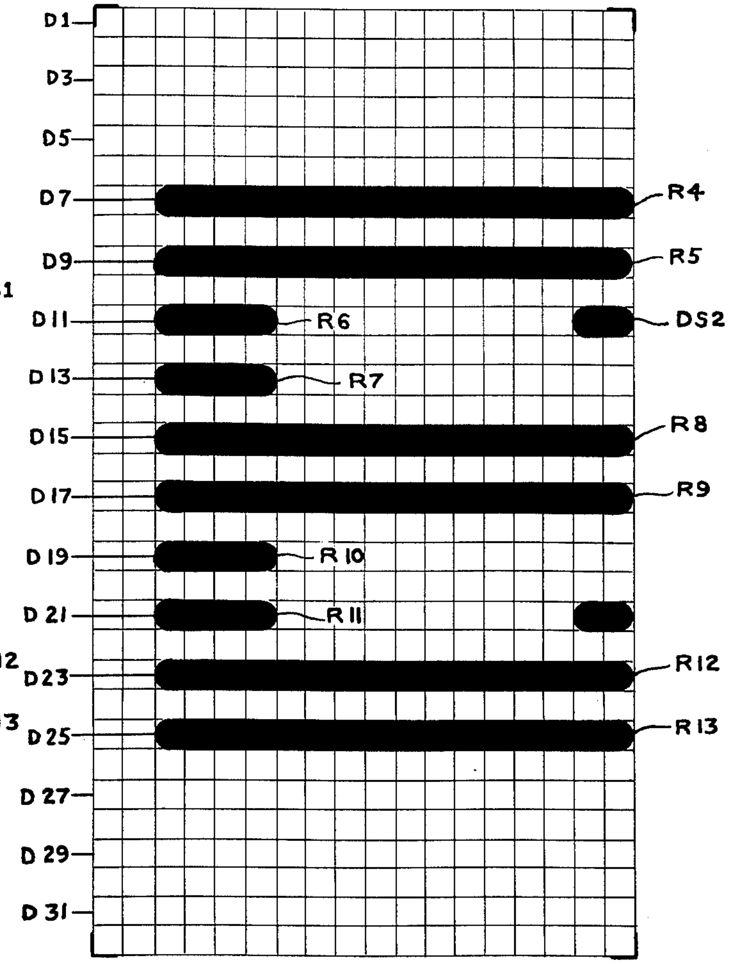
FIG. 8 is a representation of such character E with a two-to-one overall magnification.

By combining these two magnifying techniques a character can be both vertically and horizontally magnified as is shown in FIG. 8.

A system for performing this magnification will now be described utilizing FIGS. 9 and 10.

Figure 13:
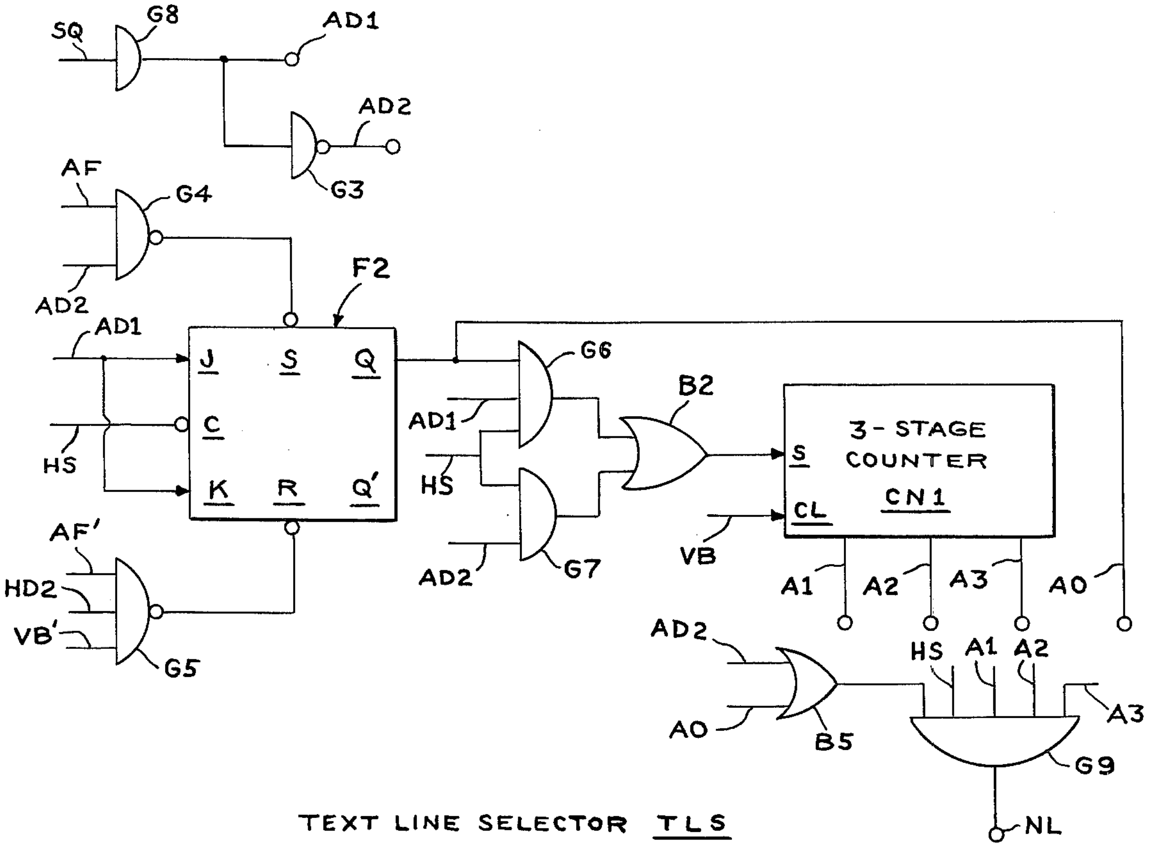
FIG. 13 is a logic diagram of the text line selector of the system of FIG. 9.
Figure 15:
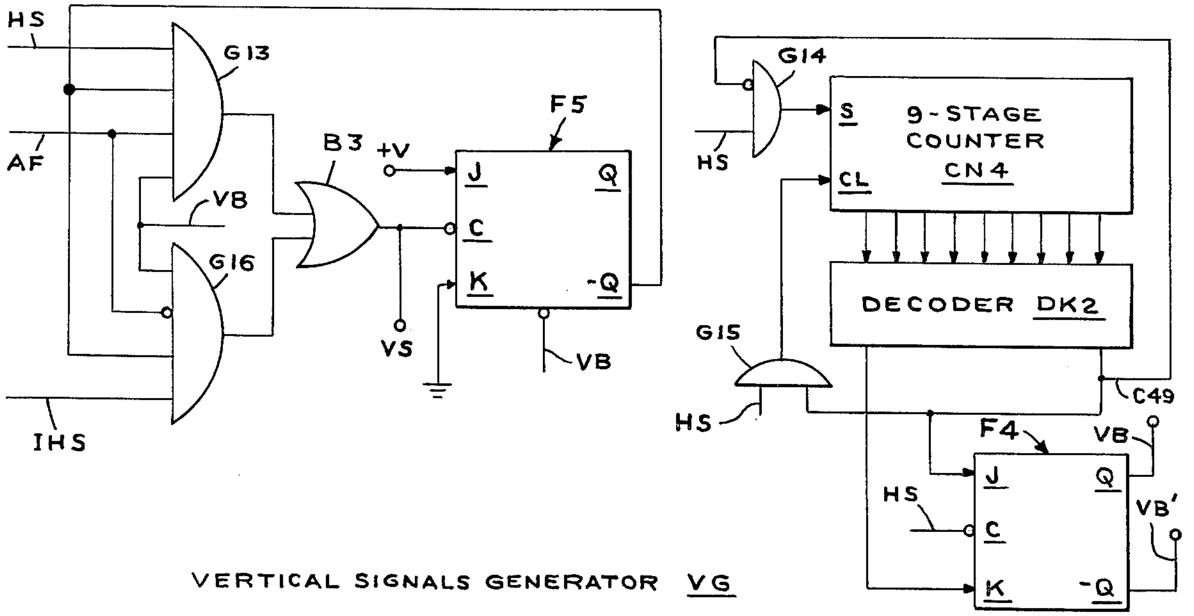
FIG. 15 is a logic diagram of the vertical signals generator of the system of FIG. 9.

In the description of the system the following conventions will be employed:

1. Each signal has a reference character equal to the signal designation, i.e., the VB signal line carries the VB signal;
2. Positive logic will be employed. Thus, when a signal is present, it is "high" and equivalent to logical 1 or (+) hile at the same time its inverse is "low" and equivalent to logical 0 or (−). When a signal is absent it is low and its inverse high. Signals will be designated by unprimed reference characters while their inverses will be represented by primed reference characters.
3. In FIG. 9 there is only shown the lines with unprimed reference characters for simplicity. However, it should be realized that there are in some instance the transfer of the inverses of such signals but the lines carrying the signals are not shown. Nevertheless, the actual signal transfers will be apparent from the descriptions of the succeeding Figures.
4. Throughout the description the terminology "graphic" is used to indicate a character, a numeric or a symbol.
5. When the expression such as "a graphic is transferred" is used, it should be realized that actually the coded combination of signals or bits forming a byte are transferred.
6. All flip-flops, counters and registers have been initialized by means not shown.
7. The flip-flops employed in the system are conventional J-K flip-flops operating with positive logic.
8. The AND-circuits are conventional positive logic AND-circuits with the further modification that a circle at the output implies an inversion of the output signal. See, for example, AND-circuits G3 and G4 of FIG. 13. Also a circle at an input implies an inversion of the input signal. See, for example AND-circuits G16 and A14 of FIG. 15.

Figure 9:
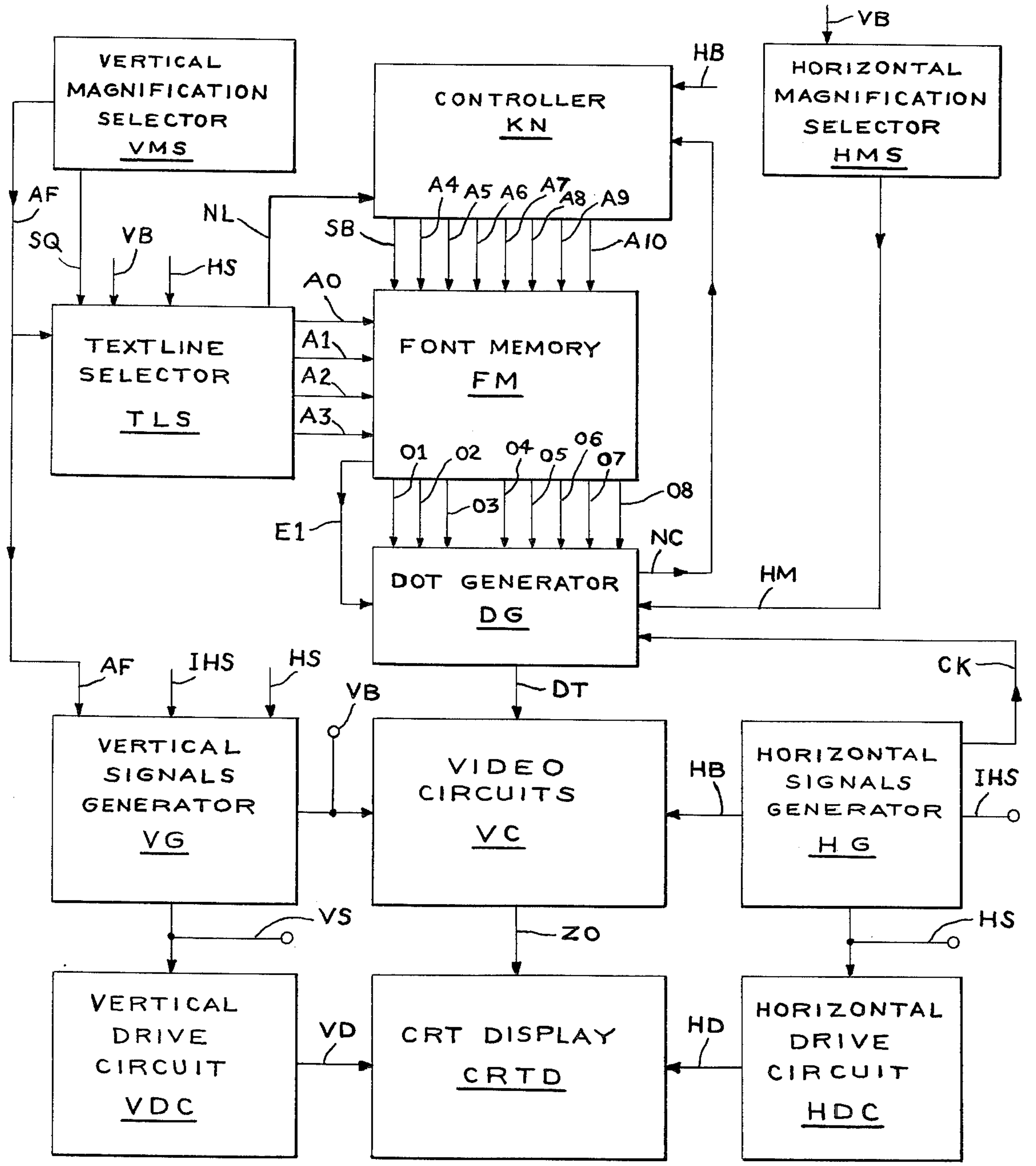
FIG. 9 is a block diagram of raster scanned display system in accordance with the invention.
Figure 10:
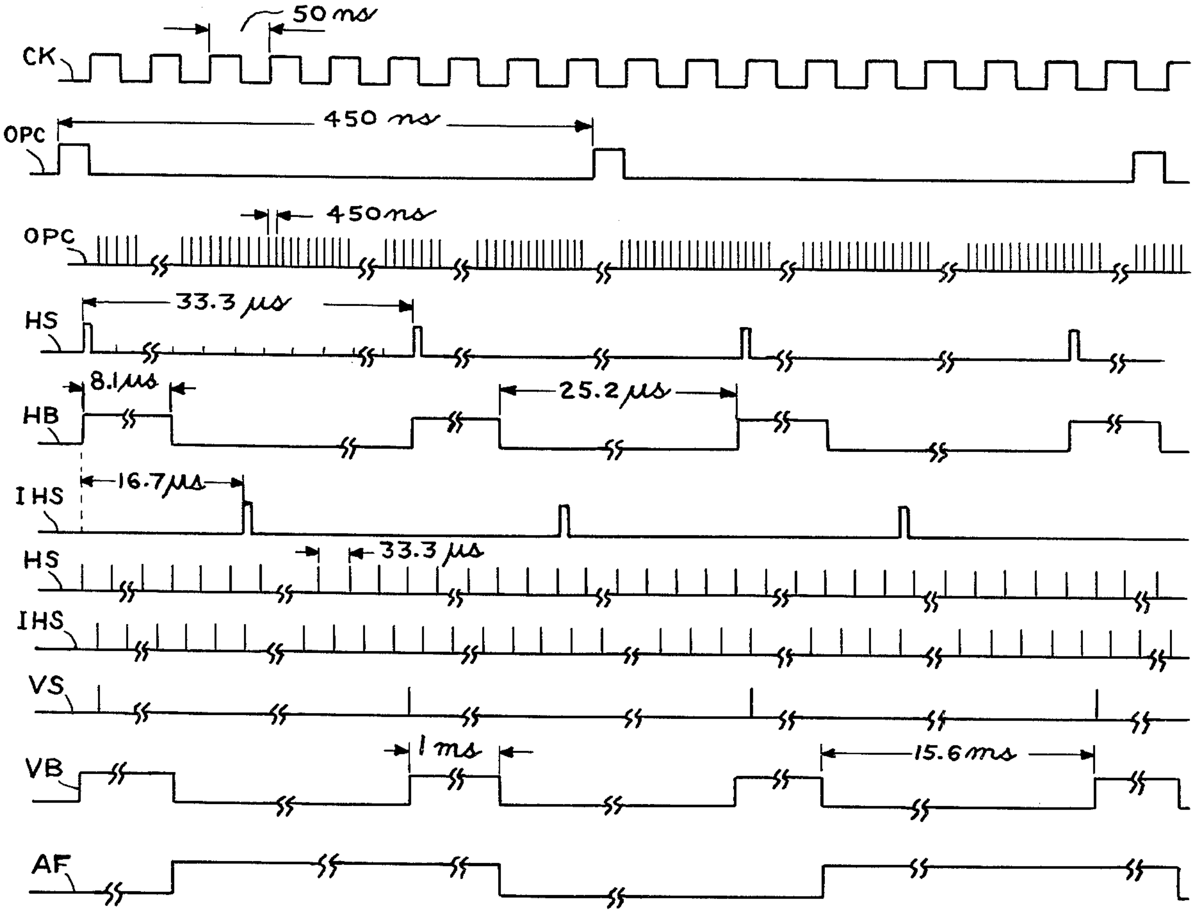
FIG. 10 is a diagram of pertinent waveforms used in describing the operation of the system of FIG. 9.

The raster scanned display system RDS of FIG. 9 comprises: a controller KN which transfers a graphic onto lines A4–A10 along with a strobe signal on line SB generally in response to a signal on line NC; a text line selector TLS which emits signals on lines A0 to A3 to select which row of the dot matrix of a selected graphic is to be displayed; a font memory FM which emits in parallel on lines O1 to O8 pulses representing the dots of a row of the dot matrix selected in accordance with addresses received on lines A0 to A10; a dot generator DG which basically receives the pulses representing the dots in parallel and emits them serially on line DT in response to shift pulses received from line CK; a vertical signals generator VG which generates the conventional vertical sync VS and vertical blanking VB signals; horizontal signals generator HB which generates the conventional horizontal sync HS signals and the horizontal blanking HB signals; video circuits VC which receives the vertical and horizontal blanking signals and the pulses representing the dots and forms a composite video signal on line Z0; a vertical drive circuit VDC which converts the vertical sync signals VS to conventional saw-tooth waveform signals on line VD: a horizontal drive circuit HDC which converts the horizontal sync signals HS to conventional saw-tooth waveform signals of line HD; a vertical magnification selector VMS which is a switch means for selecting whether the graphics are to be vertically magnified; and a horizontal magnification selector HMS which is a switch means for selecting whether to horizontally magnify the graphics.

The rasters are generated primarily by vertical signals generator VG and horizontal signals generator HG and minimally by vertical magnification selector VMS. More particularly, the basic or fundamental timing of the system is established by the CK signals generated by horizontal signals generator HG. The duration of these clock signals is determined by the desired "width of a dot" i.e., the duration of a picture element or pixel. By way of example this duration is chosen as 50 ns (nanoseconds) see FIG. 10. It should be borne in mind that all times given herein are merely exemplary and not limiting. Since there are a maximum of nine pixels per row of a graphic, internal to horizontal signals generator HSG a signal OPC is generated once every nine CK signals or 450 ns to indicate graphic demarcations. Since it will be assumed there is space to record up to fifty six graphics and there will be a retrace time equal to the time for eighteen graphics, then each horizontal sync signal HS will be generated in a time interval equivalent to seventy four graphics of 33.3 μs (microseconds). The horizontal blanking signal HB is initiated by each HS signal and has a duration of 8.1 μs. As discussed above, in order to produce interlaced fields one must start every other field about half a line time later than normal. Thus the horizontal signals generator HSG generates the IHS signals which have the same frequency as the HS signals but occur 37 graphic times or 16.65 μs later.

Once every four hundred and ninety five HS signals or 16.52 ms (milliseconds) there is generated a VB signal having a duration of thirty one HS signal periods or 1.07 ms. Thus, there is available up to 495 − 31 = 464 visible horizontal scan lines per field. If there are sixteen scan lines per text line then there can be displayed 58 text lines for a raster of interlaced scan lines or 29 text lines for a raster of sequential scan lines.

More particularly, in every field whether sequential or interlaced scanning, the above described CK, HB, HS, IHS and VB signals are generated.

When an interlaced scan or raster of interlaced scan lines is desired during the unmagnified modes, the vertical magnification selector VMS is deactivated and transmitting a SQ′ signal and not transmitting a SQ signal. In addition, during every other field the selector VMS transmits an AF signal to vertical signal generators VG. In the field during which the AF signal is present the HS and AF signals cooperate once during the time of vertical blanking (the time of the VB signal) to generate the vertical sync signal VS and the even line raster shown in FIG. 1 is generated. In the field during which the AF signal is absent the IHS and AF′ signals cooperate once during the vertical blanking time to generate the sync signal VS which now occurs at about half a display line time after the HS signal. Thus the odd line raster of FIG. 2 is generated. Because the AF signal alternates on and off from field to field there is generated the interlaced scan. When a sequential scan is desired during the vertical magnification mode, the vertical magnification selector VMS is activated forcing the continuous presence of the AF signal and the generation of only the even line rasters of FIG. 1.

It should be realized that these rasters are generated completely independent of the information to be displayed. However, the sequence by which the rows of dots of the dot matrices are selected for presentation depends on whether there is an interlaced scan or a sequential scan. The routines for the transfer are controlled by text line selector TLS. During a sequential scan the vertical magnification selector VMS continuously emits the AF and SQ signals which cooperate in text line selector TLS to modulo16 count the HS signals and generate coded combinations of the A0 to A3 which sequentially select rows R1, R2, R3, . . . , R12, R13, R14, R15 and R16 for sixteen sequentially occurring even scan lines. During an interlaced scan wherein the SQ signal is absent, and the AF signal present during alternate fields, the counting of the HS signals is more sophisticated. First of all, regardless of whether an even line or an odd line field is present each HS signal results in a two-incrementing of the HS signal count for each HS signal sensed. If the odd field is occurring the count is set to one and then the two-incrementing is performed. In this way rows R1, R3, R5, . . . , R13, R15 are sequentially selected during odd fields. During an even field the count is set to zero and then the two-incrementing is performed so that the rows R2, R4, R6, . . . , R14, R16 are sequentially selected during even fields.

Generally a line of graphics is present in controller KN. A graphic is transferred via lines A4 to A10 to font memory FM along with a strobe bit SB while at the same time signals on lines A0 to A3 select which row of dots of the matrix of the selected graphic is to be transferred from font memory FM, via lines O1 to O8, to dot generator DG. After dot generator DG has received the row of dots, the dots are shifted out serially by CK pulses in response to an E1 signal from memory FM indicating the transfer from the memory has been performed. If there is horizontal magnification the HM signal controls the dot generator to make each dot available twice on line DT. After there have been nine shifts, an NC signal is sent back to the controller KN instructing it to make available the next graphic on the line. At the end of the display line there is a horizontal retrace: and the next row of the same set of graphics is displayed. After the sixteenth row of a line of graphics has been displayed an NL signal is fed from text line selector TLS to controller KN to load up a new line of graphics for display.

The various units of the raster scanned display system RDS will now be described.

Figure 11:
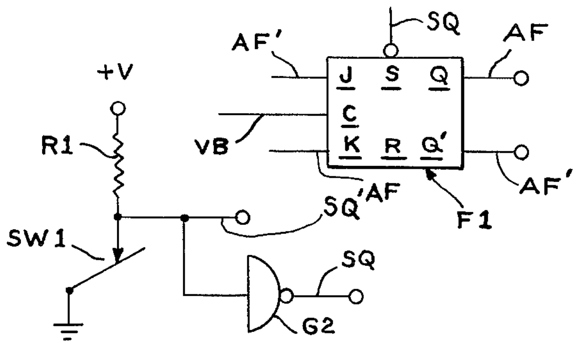
FIG. 11 is a schematic diagram of the vertical magnification selector of the system of FIG. 9.

The vertical magnification selector VMS is shown in FIG. 11 comprising a single-pole single-throw (SPST) switch SW1 whose movable contact is grounded and whose fixed contact is connected via resistor R1 to a positive voltage +V. The fixed contact is directly connected to line SQ' and, via one-input AND-circuit G2, acting as an inverter, to line SQ. Thus when the switch is closed as shown, signal SQ' is low or absent and signal SQ high or present indicating the vertical magnification mode. Included in selector VMS is the flip-flop F1 whose Q'-output is fed back to its J input, and whose G-output is fed back to its K-input so that the flip-flop switches state each time a VB signal is received at its C-input. In this way the alternate fields of interlace scanning are indicated. However, during the magnify mode the SQ signal is present at the S-input of the flip-flop forcing it in the set state with the AF signal continuously present.

Figure 12:
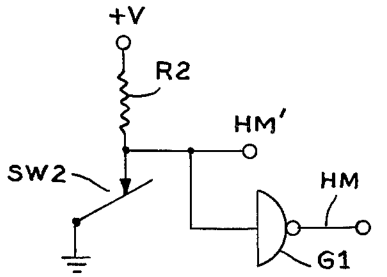
FIG. 12 is a schematic diagram of the horizontal magnification selector of the system of FIG. 9.

In FIG. 12 the horizontal magnification selector HMS is shown comprising the SPST switch SW2 having a grounded movable contact and a fixed contact connected via resistor R2 to voltage source +V. In addition, the fixed contact is connected to line HM' and, via AND-circuit G1 acting as an inverter to line HM. When the switch is closed as shown in FIG. 12 the HM' signal is low or absent and the HM signal high or present. When the switch is open the states of the signals are reversed. It should be noted that although the selectors HMS and VMS are shown utilizing mechanical switches, remotely operated electronis switches can and most likely would be used.

Text line selector TLS centers around a four stage binary counter which counts HS signals and transmits signals representing the count on lines A0, A1, A2 and A3. The counter has for a first or least significant stage the flip-flop F2 which is connected via the logic network consisting of AND-circuits G6 and G7 and OR-circuit B2 to the 3-stage binary counter CN1 constituting the three more significant stages. The combination of AND-circuit G8 acting as an amplifier for converting the SQ signal to an "add-one" AD1 signal and the AND-circuit G3 acting as an inverter for providing "add-two" AD2 control whether the counter increments by one or two for each received HS signal. During the AD1 signal time (vertical magnify or sequential mode), the NL signal is generated every 16 lines. In this case signals A0 to A3 are significant inputs to AND-circuit G9. During the AD2 signal time (non vertical magnify or interlaced mode) the NL signal is generated every eight lines, whether they be odd or even. In this case, only the A1 to A3 signals are significant inputs to AND-circuit G9 with the remaining input forced high by the presence of the AD2 signal at the OR-circuit B5.

The counter unit counts during the vertical magnify mode when the SQ signal is present given the AD1 signal and not the AD2 signal. In such case the AD1 signal present at the J and K inputs of the flip-flop F2 causes the latter to binary count HS signals received at its C-input. The Q-output of flip-flop F2 is the A0 signal line or the least significant bit of a matrix row count. The AD1 signal cooperates with the HS signal at inputs of AND-circuit G6 to effectively couple the Q-output of flip-flop F2 via OR-circuit B2 to the count input S of sounter CN1 so that there is made in effect a four stage binary counter for counting the HS signals. The outputs of the three stages of counter CN1 are connected to lines A1, A2 and A3 representing the three more significant bits of the row number. Note, in this case every other HS signal is received at the S-input of counter CN1.

During an interlaced scan the SQ signal is absent. Therefore, the AD1 signal is absent and the AD2 signal is present. Thus, the state of the flip-flop F2 is frozen and the HS signals received at the C-input thereof are not counted. In addition, AND-circuit G6 is blocked, decoupling the Q-output of flip-flop F2 from the S-input of counter CN1. Instead, AND-circuit G7 is opened so that every HS signal is fed to the S-input of counter CN1. In effect then the line counter is incremented by two for each HS signal.

It will be recalled that for odd fields the count should start at one and then be double incremented up to a count of fifteen. For even fields the count should start at zero and then be double incremented up to a count of sixteen. The initial one or zero is determined by the signal on line A0, i.e., the Q-output of flip-flop F2. If the flip-flop is set, then the Q-output is high as is the A0 signal and the initial count is one. If the flip-flop is reset, then the Q-output is low as is the A0 signal and the initial count is zero.

The flip-flop F2 is set when the AF and AD2 signals are simultaneously received at the inputs of AND-circuit AD2 whose output is connected to the S-input of flip-flop F2. The flip-flop is reset by the coincidence of the AF', AD2 and VB' signals at the inputs of AND-circuit G5 whose output is connected to the R-input of flip-flop F2. Note the VB' signal is actually for an initial clear of the flip-flop at the start of each line as is the VB signal fed to the initializing or CL-input of counter CN1.

Figure 14:
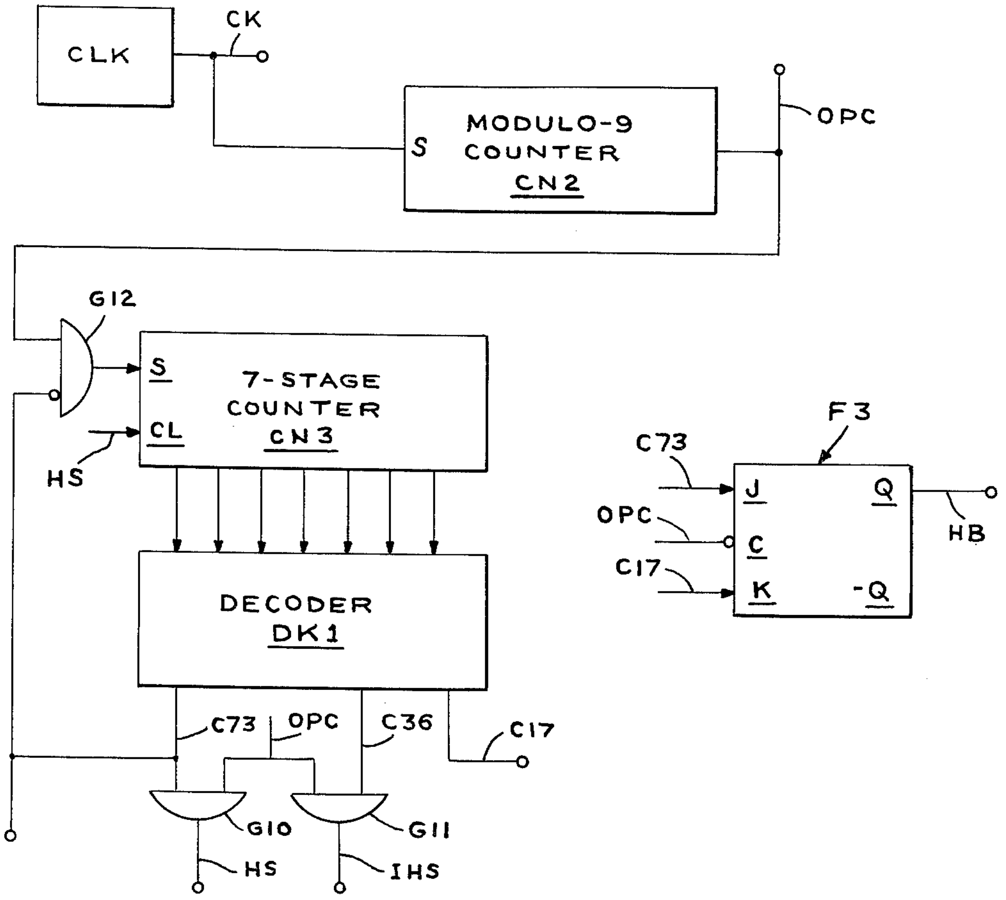
FIG. 14 is a logic diagram of the horizontal signals generator of the system of FIG. 9.

The horizontal signals generator HG shown in FIG. 14 includes a clock generator CLK which generates the 50 ns CK signals. The generator can be a free running relaxation oscillator or a crystal controlled square wave generator. See FIG. 10 for the appropriate waveforms. The CK signals are fed to the S-input of a modulo-9 counter CN2 which emits a pulse after each nine CK signals received at the S-input. The counter can be a nine stage shift register acting as a ring counter which is initially cleared at the start of operations; or can be a four stage binary counter with appropriate feedback to cycle at a nine pulse time rate. For example, the outputs of the counter can be connected to a decoder which decodes the count of nine to then initialize the counter. In any event, the output of the modulo-9 counter CN2 is the OPC signal which is fed via AND-circuit G12 to the step or count input S of seven-stage binary counter CN3. The outputs of the counter CN3 are connected to a decoder DK1 which emits a signal on line C17 whenever the OPC signal count is 17, and emits a signal on line C36 for a 36 count and a signal on line C73 for a 73 count. The decoder can be a set of three AND-circuits, whose inputs are the appropriate outputs of the counter stages for the desired counts. The C73 signal is fed to one input of AND-circuit G10 where it is gated by the next occurring OPC signal to become the HS signal. Note the HS signal, in addition to providing the horizontal sync, is also fed to the CL-input to clear counter CN3 to its initial state for starting a new counting cycle. The C73 signal fed to the inhibiting input of AND-circuit G12 is to insure proper clearing of the counter. The C36 signal is strobed by the OPC signal at AND-circuit G11 to become the IHS signal. In this manner the HS and IHS signals are generated once per 33.3 μs.

The VB signal is generated by the flip-flop F3 whose Q-output is connected to line VB. The J-input of the flip-flop is connected to line C73 and the K-input to line C17 while the C-input is connected to line OPC. Thus, the flip-flop F3 is set at the HS signal time and reset seventeen OPC pulses later.

The vertical signals generator VG generates the VB signals with circuitry associated with flip-flop F4 and generates the VS signals with circuitry associated with flip-flop F5. More particularly, the VB signal generator includes the 9-stage binary counter CN4 which receives HS signals for counting from AND-circuit Q14 and which transmits count value signals from its stages to decoder DK2. In general, after the counter CN4 is cleared, the count of the HS signals is accumulated in counter CN4. At the count of 31 the C31 signal is fed to the K-input of flip-flop F4 which resets terminating the VB signal at the next occurring HS signal received at the C-input. When the count reaches 494 the signal on line C494 is fed to the J-input of flip-flop F4 which sets with the next occurring HS signal to initiate the VB signal. In addition the signal on line C494 gates the next occurring HS signal through AND-circuit G15 to the CL-input of counter CN4 which is then initialized to start a new count. Note that the C494 signal at the inhibiting input of AND-circuit G14 is to insure the proper timing for the initializing. Thus it is seen that the VB signal has a duration of 32 HS signal periods while the visible portion of the vertical period is 464 HS signal periods.

The counter CN4 can be a conventional 9 stage cascaded binary counter while the decoder DK2 can be two AND-circuits each connected to the appropriate outputs of the binary counter stages to detect the counts of signal 494.

The VS signal is actually the first occurring HS or IHS signal present after the start of the VB signal and is generated at the output of OR-circuit B3 which has inputs connected to the outputs of AND-circuits G13 and G16. If there is a sequential scan or the even field of an interlaced scan, then the AF signal cooperates with the VB signal at the start of the VB period to pass the HS signal through AND-circuit G13 and OR-circuit B3 to become the VS signal. If there is the odd field of an interlaced scan then the absencces of AF signal cooperates with the VB signal at AND-circuit G16 to pass the IHS signal just after the start of the VB period through AND-circuit Q16 and OR-circuit B3 to become the VS signal. Note at the end of each VB signal, flip-flop F5 is cleared and the signal at its Q'-output goes high to remove any inhibitions on AND-circuits G13 and G16. When a VS signal is generated, the trailing edge of that signal at the C-input of flip-flop F5 sets the flip-flop to block AND-circuits G13 and G16. It is this mechanism which insures only one VS signal is generated per VB signal and only at or near the start thereof.

Figure 16:
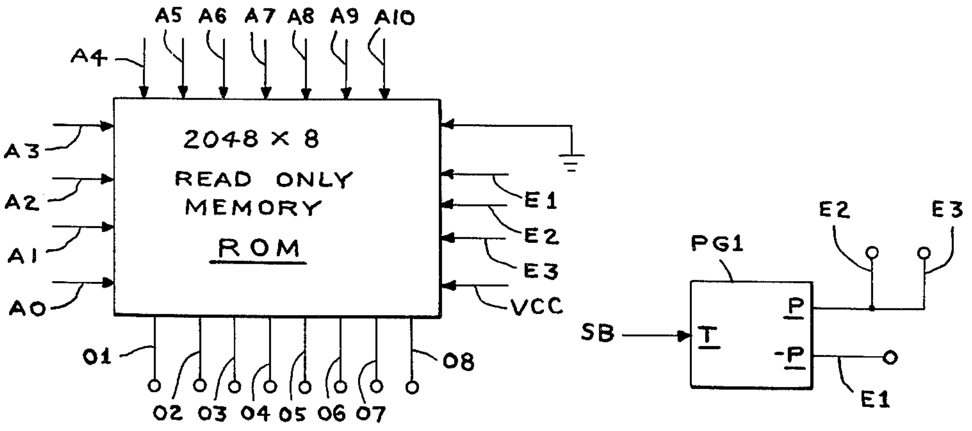
FIG. 16 is a logic diagram of the font memory of the system of FIG. 9.

Font memory FM shown in FIG. 16 comprises a read only memory ROM and a delayed pulse generator PG3. The memory ROM which stores the matrices of the symbols can be a read-only memory such as type 6275 made by Monolithic Memories, Incorporated in Sunnyvale, Ca. 94086. In such a memory there is storable 2048 eight-bit words in 2048 registers. Since a typical dot matrix has sixteen nine-bit rows wherein one bit is always zero (see FIG. 4) then one can store the dot matrices for 2048 ÷ 16 = 128 graphics. (The consistent zero need not be stored.) The dot matrices are stored for organized selection wherein the signals A4 to A10 select the desired dot matrix and the signals A0 to A4 select the register containing the presently wanted eight bit row of said desired dot matrix. The outputs 01 to 08 emit the eight bit rows. Sampling signals E1, E2, and E3 are generated by pulse generator PG1 which can be a pair of cascaded one shot multivibrators wherein the first multivibrator is triggered by an SB signal and sometime thereafter the second multivibrator is triggered by the trailing edge of the pulse generated by the first multivibrator to generate oppositely polarized pulses at its P- and P'-outputs. In this way sampling signals E1, E2, and E3 are generated a period of time after the memory has been addressed. Table I shows the signal connections to the pins of devices 6275.

TABLE I

| Pin Number | Signal | Pin Number | Signal |
|---|---|---|---|
| 1 | A7 | 13 | VCC |
| 2 | A6 | 14 | A8 |
| 3 | A5 | 15 | A9 |
| 4 | A4 | 16 | A10 |
| 5 | A3 | 17 | E1 |
| 6 | A2 | 18 | E2 |
| 7 | A1 | 19 | E3 |
| 8 | A0 | 20 | O8 |
| 9 | 01 | 21 | O7 |
| 10 | O2 | 22 | O6 |
| 11 | O3 | 23 | O5 |
| 12 | GND | 24 | O4 |

Figure 17:
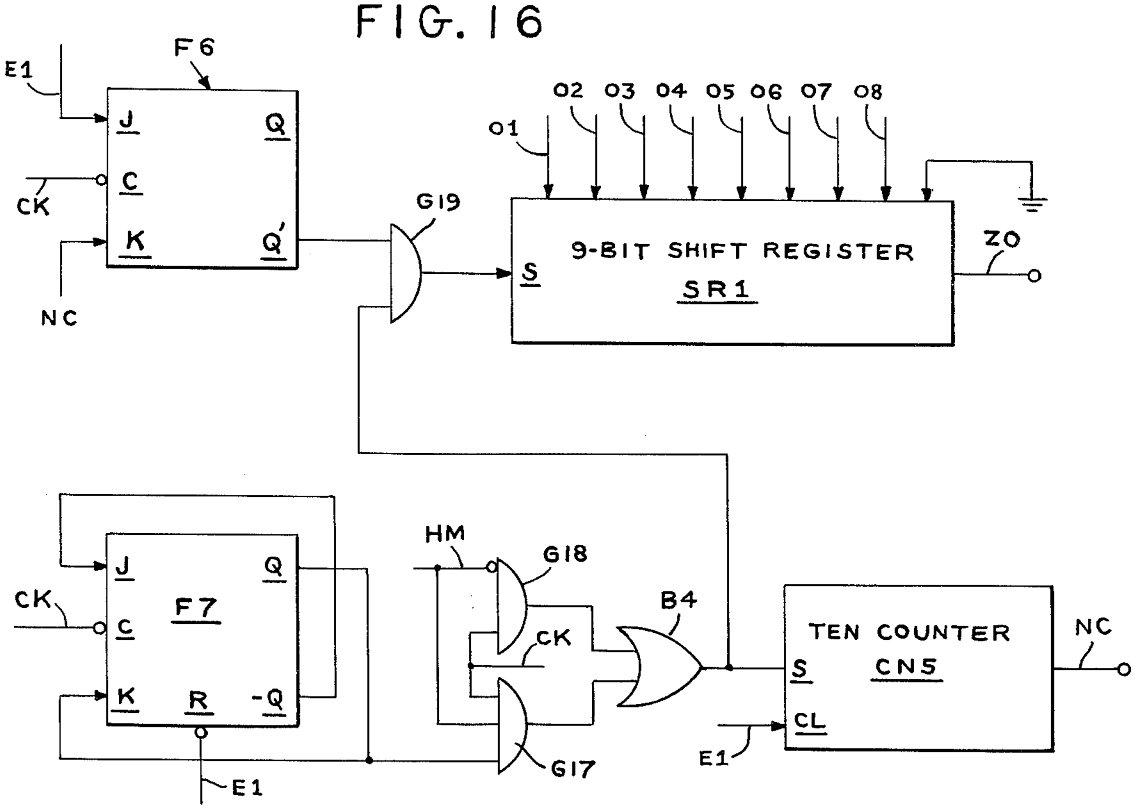
FIG. 17 is a logic diagram of the dot generator of the system of FIG. 9.

The dot generator DG shown in FIG. 17 centers around the 9-bit shift register SR1 whose first stage input is grounded to always be initially loaded with a zero (no dot) and whose eight succeeding stages received the eight bit row word on lines 01 to 08. After the word is loaded, it is shifted out serially on line ZO by shift pulses received from the output of AND-circuit G19 which is controlled by flip-flop F6. The flip-flop insures that only nine shift pulses are generated per word and only after the word has been loaded in the shift register. The shift pulses are received from OR-circuit B4. Under the normal or unmagnified horizontal mode the HM signal is absent. Thus AND-circuit G18 is open and AND-circuit G17 blocked. Thus uninterrupted CK pulses pass through AND-circuit G18 and OR-circuit B4 to be the shift pulses. During the horizontal magnify mode the HM signal is present blocking AND-circuit G18 and opening AND-circuit G17. Note that the Q-output of flip-flop F7 is connected to an input of AND-circuit G17. This flip-flop is feedback cross connected to act as a one stage binary counter of CK signals at its C-input. Thus for every two CK signals at the C-input the Q-output is high for an CK signal period so that for every two CK signals only one strobe pulse passes through AND-circuit G17 and OR-circuit B4 to the shift register. In this way each dot position of the word is present twice on line Z0. The stroke pulses from OR-circuit B4 are also fed to the step input of ten counter CN5 which emits a pulse on line NC after nine shift pulses have been received at the S-input following initializing by an E1 signal at its CL-input. Counter CN5 can be a ten stage shift register which is initialized by clearing all stages to zero and loading a one into its first stage so that after nine shift pulses the one is in the tenth stage which is connected to line NC.

The video circuits VC can take many forms. A particularly suitable device is shown in my U.S. Pat. No. 3,946,275. In such case one of the binary sources is deleted and the other binary source is the dot generator DG of the present application. The blanking source BL therein can be an OR-circuit which receives the VB and HB signals of the present application.

The vertical drive circuit DVC can also take on many forms. A particularly suitable circuit is shown in my U.S. appln. Ser. No. 525,766 now U.S. Pat. No. 3,970,896 wherein the vertical sync source VSS therein is the vertical signals generator VG of the present application. Similarly, the horizontal drive circuit HDC is well known. A particularly suitable circuit is shown in my U.S. Pat. No. 3,931,545 wherein the horizontal sync pulse source HSP therein is the horizontal signals generator HG of the present application. The CRT display CRTD is merely a cathode ray tube with accelerating voltages and vertical and horizontal deflection coils as shown and described in any of the three above cited patents.

The controller KN can be a multiword buffer register which in response to a signal emits an 7-bit character code on lines A4 to A10 along with a strobe pulse on line SB. The most common such devices are the I/O channels of central processing units.

For the example given there is 58 text lines of data with 74 graphics per page-line. When doubling takes place just along the vertical dimension the display reduces to 29 text lines of 74 graphics per text line. However, the graphics are twice as tall as they were previously. When doubling takes place along both the vertical and horizontal dimensions, the display reduces to 29 text lines of 37 graphics per text line. In this case, the characters will be twice as tall and twice as wide as they were previously. By providing control of both the scanning mode and/or the horizontal video time interval, an operator can alternately switch between a small graphic, full-page, display and a "magnified" graphic, partial-page display.

The operator is usually concerned with only a portion of the full page of data most of the time such as when data is being entered via a keyboard. Consequently, the operator commands the terminal to change from interlaced to sequential scanning in order to enlarge the characters for easier viewing. If more than 29 text lines of data are entered in this enlarged character, or magnify, mode a program perform conventional scrolling techniques in which the display is moved upward on a signal text line basis whereupon the first text line entered (on the top of the screen) disappears.

There has thus been shown a method for changing the resolution of a raster scan by switching between sequential and interlaced modes. This method can be used for reading systems such as those using iconoscopies or display systems such as those using kinescopes in a display system whether it be CRT, laser, xerographic, magnetic ink, etc. The size of the graphics being displayed can be controlled by selecting between sequential and interlaced scans. Furthermore, there has been shown apparatus for selecting indicia associated with graphics to be displayed so that the indicia is made available in the proper sequence depending on the presence of interlaced or sequential scans. Finally there has been shown apparatus for manifying one dimension of a graphic by displaying the same indicia twice in sequence.

Although only one embodiment of the invention has been shown and described, there will now be obvious to those skilled in the art many modifications and variations satisfying many or all of the objects of the invention without departing from the spirit thereof as defined by the appended claims.

What is claimed is:

1. In a display system wherein a beam is intensity modulated while scanning a record medium to display graphics and wherein the display system includes means for selectively perform sequential or interlaced scans of parallel display lines, apparatus for controlling the intensity modulation of the beam comprising: storing means for storing indicia associated with matrices of dots representing graphics wherein each row of dots of each matrix is stored in an addressed register of the storing means and the rows of dots of each matrix are stored in sequentially addressed registers; graphic selection means for generating a first portion of an address representing a desired graphic; row selection means for generating a second portion of said address representing a presently desired row of dots of the matrix of the desired graphic; and receiving means for receiving the indicia stored in the register indicated by said row selection means and said graphic selection means for controlling the intensity of the beam in accordance with the pattern of dots represented by said indicia; said row selection means including means for sequentially changing by one unit the second portion of said address for each subsequent display line when a sequential scan is being performed and for sequentially changing by two units the second portion of said address for each subsequent display line when an interlaced scan is being performed.

2. The apparatus of claim 1 wherein said row selection means includes a counter means and incrementing means for selectively incrementing by one or two the counts stored therein, and means for converting the count in said counter means to said second portion of said address.

3. The apparatus of claim 2 wherein said incrementing means increments the count by two during interlaced scans and further comprising means for clearing said counter means to zero for the even field of an interlaced scan and to one for the odd field of an interlaced scan.

4. The apparatus of claim 1 wherein said receiving means includes beam intensity control means and transmitting means for sequentially transmitting binary control signals to said beam intensity control signals in accordance with said pattern of dots wherein the binary control signals are in one to one correspondence with the elements of said pattern.

5. The apparatus of claim 4 wherein said transmitting means selectively transmits one binary control signal for each element of said pattern or two identical binary control signals for each element of said pattern.

6. In a display system utilizing a beam which raster scans a record medium with a plurality of parallel lines while being intensity modulated in accordance with the graphic to be displayed, the graphic having *n* rows of indicia, each of said rows being recorded on the record medium during the occurrence of a different one of the parallel lines of the raster scan, the method of varying the height of the displayed graphic comprising: for displaying the graphic with a first given height, generating a sequential raster scan in a frame and during each successive line of the sequential raster scan intensity-modulating the beam in accordance with the indicia in each successive row of the graphic whereby all *n* rows of the graphic are displayed during the single field of a single frame of the sequential scan; and, for displaying said graphic with a second given height which is half said first given height, generating an interlaced raster scan wherein each frame comprises an odd field and an even field, during said odd field, intensity modulating the beam in accordance with the indicia in each successive odd row of the graphic, and, during said even field, intensity modulating the beam in accordance with the indicia in each successive even row of the graphic.

7. The method of claim 6 wherein the display system utilizes a cathode ray tube having an electron beam that is intensity modulated while scanning a screen in a raster comprising a plurality of vertically displaced parallel lines which are generally horizontally oriented.

8. The method of claim 6 wherein the indicia in each row of the graphic being a plurality of dots further comprising the step of increasing the width of the displayed graphic by displaying each dot more than once.

* * * * *